(12) United States Patent
Everett, Jr. et al.

(10) Patent No.: US 9,642,191 B2
(45) Date of Patent: May 2, 2017

(54) PORTABLE CONTAINER SYSTEM FOR HEATING A BEVERAGE

(71) Applicant: Spectrum Brands, Inc., Middleton, WI (US)

(72) Inventors: David William Everett, Jr., Verona, WI (US); Charles Nelson, Minneapolis, MN (US); Daniele Rosati, Verona, WI (US); Karl Warner Marschke, Madison, WI (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 14/688,793

(22) Filed: Apr. 16, 2015

(65) Prior Publication Data

US 2015/0305094 A1 Oct. 22, 2015

Related U.S. Application Data

(60) Provisional application No. 61/980,468, filed on Apr. 16, 2014, provisional application No. 62/014,279, filed on Jun. 19, 2014.

(51) Int. Cl.
*H05B 3/68* (2006.01)
*A47J 31/46* (2006.01)
(Continued)

(52) U.S. Cl.
CPC .......... *H05B 3/68* (2013.01); *A47J 27/21191* (2013.01); *A47J 27/2105* (2013.01);
(Continued)

(58) Field of Classification Search
None
See application file for complete search history.

(56) References Cited

U.S. PATENT DOCUMENTS 1,366,135 A * 1/1921 Speirs .................... B22D 41/01
                                                            219/421
1,978,089 A * 10/1934 Jones .................. A47J 36/2466
                                                            219/432
(Continued)

FOREIGN PATENT DOCUMENTS

CA 2062259 9/1992
CA 2062259 A1 9/1992
(Continued)

OTHER PUBLICATIONS

CN 202161163 U, Wang, Heating Kettle, Mar. 14, 2012, partial translation.*
(Continued)

*Primary Examiner* — Joseph M Pelham
(74) *Attorney, Agent, or Firm* — Kagan Binder, PLLC

(57) ABSTRACT

In a portable container system for heating a beverage generally, the system includes a container for containing a beverage to be heated. The container generally has a bottom and a side wall together defining an internal reservoir containing the beverage to be heated. A base of the system is operable to heat the container at the bottom thereof. The base is constructed of multiple layers generally including at least a top barrier layer, an electrically non-conductive bottom barrier layer and a thin film heating element intermediate the top barrier layer and the bottom barrier layer.

4 Claims, 7 Drawing Sheets

(51) Int. Cl.
*A47J 36/14* (2006.01)
*A47J 27/21* (2006.01)
*H05B 3/48* (2006.01)
*A47J 31/44* (2006.01)

(52) U.S. Cl.
CPC .... *A47J 27/21008* (2013.01); *A47J 27/21041* (2013.01); *A47J 31/441* (2013.01); *A47J 31/46* (2013.01); *A47J 31/465* (2013.01); *A47J 36/14* (2013.01); *H05B 3/48* (2013.01); *H05B 2203/021* (2013.01)

(56) References Cited

U.S. PATENT DOCUMENTS

| | | | |
|---|---|---|---|
| 2,509,008 A | 5/1950 | McFarland | |
| 2,863,037 A * | 12/1958 | Johnstone | A47J 36/2466 165/135 |
| 3,072,042 A | 1/1963 | Davis | |
| 3,074,192 A | 1/1963 | Smith | |
| 3,092,704 A * | 6/1963 | De Woody | A47J 36/2483 219/385 |
| 3,266,661 A * | 8/1966 | Dates | H01B 1/00 156/89.17 |
| 3,605,604 A | 9/1971 | Diebolb et al. | |
| 3,725,645 A * | 4/1973 | Shevlin | A47J 39/006 165/201 |
| 3,885,129 A * | 5/1975 | Fabricius | H05B 3/06 219/433 |
| 3,931,494 A * | 1/1976 | Fisher | A47J 36/2461 219/386 |
| 4,094,446 A * | 6/1978 | Brutsman | A47J 27/14 219/431 |
| 4,141,286 A | 2/1979 | Smit | |
| 4,352,252 A | 10/1982 | Brenot | |
| 4,356,381 A | 10/1982 | Flaherty, Jr. et al. | |
| 4,754,122 A * | 6/1988 | Coppier | A47J 27/2105 219/432 |
| 4,801,782 A * | 1/1989 | Ineson | A47J 36/2466 219/438 |
| 4,808,490 A | 2/1989 | Tsukuda et al. | |
| 4,825,757 A * | 5/1989 | Stoner | A47G 19/12 215/396 |
| 4,888,467 A | 12/1989 | Hoffmann | |
| 4,889,974 A | 12/1989 | Auding et al. | |
| 4,941,597 A * | 7/1990 | Lopez | B67D 1/0081 165/164 |
| 5,019,691 A * | 5/1991 | Lai | H05B 3/262 219/432 |
| 5,040,700 A * | 8/1991 | Compton | A47J 47/01 219/535 |
| 5,208,896 A * | 5/1993 | Katayev | A47J 36/2433 219/432 |
| 5,283,420 A * | 2/1994 | Montalto | A47G 19/2288 219/432 |
| 5,369,398 A | 11/1994 | Vancha | |
| 5,475,199 A | 12/1995 | Buchanan | |
| 5,616,266 A | 4/1997 | Cooper | |
| 5,721,418 A | 2/1998 | Hazan et al. | |
| 5,881,710 A | 3/1999 | Davis et al. | |
| 5,990,456 A * | 11/1999 | Kilbride | A47J 36/34 219/432 |
| 6,018,897 A | 2/2000 | Lin | |
| 6,037,572 A | 3/2000 | Coates et al. | |
| 6,072,161 A * | 6/2000 | Stein | A47J 36/2472 219/386 |
| 6,192,787 B1 * | 2/2001 | Montalto | A47J 36/2472 219/430 |
| 6,310,329 B1 * | 10/2001 | Carter | A47G 19/2288 219/430 |
| 6,311,868 B1 | 11/2001 | Krietemeier et al. | |
| 6,376,816 B2 | 4/2002 | Cooper et al. | |
| 6,403,928 B1 * | 6/2002 | Ford | A47J 36/2461 219/386 |
| 6,674,052 B1 * | 1/2004 | Luo | A47J 41/0077 219/432 |
| 6,748,646 B2 * | 6/2004 | Von Arx | A47G 19/2288 219/438 |
| 6,809,298 B2 * | 10/2004 | Baba | A47J 41/005 219/387 |
| 6,840,802 B2 * | 1/2005 | Shepherd | H01R 13/7137 219/432 |
| 7,607,246 B2 | 10/2009 | Valiyambath Krishnan et al. | |
| 7,797,863 B2 | 9/2010 | Moreno Jordana | |
| 7,926,209 B2 | 4/2011 | Yeung et al. | |
| 8,188,965 B2 | 5/2012 | Yang | |
| 8,216,622 B2 | 7/2012 | Evans, Sr. et al. | |
| 8,618,448 B2 * | 12/2013 | Alexander | A47G 19/2288 165/58 |
| 8,759,721 B1 * | 6/2014 | Alexander | A47G 19/2288 165/58 |
| 9,186,006 B2 * | 11/2015 | Soule | A47G 19/2288 |
| 9,265,371 B2 * | 2/2016 | Glucksman | A47G 19/2288 |
| 2002/0051632 A1 | 5/2002 | Kodden et al. | |
| 2003/0146204 A1 * | 8/2003 | Kaastra | H05B 3/26 219/441 |
| 2005/0160635 A1 | 7/2005 | Chen | |
| 2006/0043087 A1 | 3/2006 | Gagas et al. | |
| 2006/0081603 A1 | 4/2006 | Van Der Meulen | |
| 2009/0184102 A1 * | 7/2009 | Parker, Jr. | A47J 36/2472 219/387 |
| 2009/0272728 A1 | 11/2009 | Abbott | |
| 2010/0012643 A1 | 1/2010 | Li et al. | |
| 2010/0058623 A1 | 3/2010 | Fernandez | |
| 2010/0218684 A1 | 9/2010 | Etter et al. | |
| 2010/0224618 A1 * | 9/2010 | Lin | A47J 36/2483 219/438 |
| 2011/0259869 A1 | 10/2011 | Hlavaty | |
| 2012/0037009 A1 | 2/2012 | Blanc et al. | |
| 2012/0061372 A1 | 3/2012 | James et al. | |
| 2012/0163780 A1 | 6/2012 | De Luca | |
| 2013/0019756 A1 | 1/2013 | Coats et al. | |
| 2013/0125427 A1 | 5/2013 | De Vries et al. | |
| 2013/0125760 A1 | 5/2013 | Pitrucha | |
| 2013/0319996 A1 | 12/2013 | Harward et al. | |
| 2014/0209598 A1 * | 7/2014 | Bonnel | A47J 27/004 219/621 |
| 2015/0366246 A1 * | 12/2015 | Johnson | A23L 1/1812 99/323.5 |

FOREIGN PATENT DOCUMENTS

| | | |
|---|---|---|
| CN | 2867110 | 2/2007 |
| CN | 202161163 U * | 3/2012 |
| GB | 900517 | 4/1962 |
| GB | 900517 A | 7/1962 |
| WO | 9909791 | 2/1999 |
| WO | 9909791 A1 | 2/1999 |
| WO | 0067527 | 11/2000 |
| WO | 0067527 A1 | 11/2000 |
| WO | 2009085038 | 7/2009 |
| WO | 2009085038 A1 | 7/2009 |
| WO | 2010131017 | 11/2010 |
| WO | 2010131017 A2 | 11/2010 |
| WO | 2013038186 | 3/2013 |
| WO | 2013038186 A1 | 3/2013 |

OTHER PUBLICATIONS

ISR/WO, PCT/US15/25881, mailed Jul. 24, 2015, 11 pages.
ISR/WO, PCT/US15/026242, mailed Jul. 8, 2015, 50 pages.
ISR/WO, PCT/US15/026236, mailed Oct. 087, 2015, 24 pages.
International Search Report for PCT/US2015/026242 dated Jul. 8, 2015.

* cited by examiner

PORTABLE CONTAINER SYSTEM FOR HEATING A BEVERAGE

CROSS-REFERENCE TO RELATED APPLICATIONS

This application claims the benefit of U.S. Provisional Application No. 61/980,468 filed on Apr. 16, 2014, and to Provisional Application No. 62/014,279 filed on Jun. 19, 2014, both of which are incorporated by reference.

BACKGROUND

The present invention relates generally to portable container systems for heating beverages such as water, coffee, tea and like, and more particularly to such container systems that employ a thin film heating element.

The present disclosure employs a thin film heating element as part of a portable container system used to heat a beverage. The term portable refers to the ability of the container, during or after heating of its contents, to be carried to a remote location for dispensing such as pouring into a cup. Such portable container systems typically include a container, by itself or in combination with a heating plate on which the container may seat during a heating operation. Suitable containers are typically in the form of a kettle such as a tea kettle, coffee pot, carafe or similar container, but may alternatively take generally any configuration.

In portable container systems for heating a beverage, the wait time for heating the beverage can often be undesirable. Heating to a desired temperature on a consistent basis is also a challenge.

It would be useful, therefore, to provide a portable container system for heating beverages that enables the beverage to be heated quicker and to a more precise temperature.

SUMMARY

In one embodiment, a portable container system for heating a beverage generally comprises a container for containing a beverage to be heated. The container generally comprises a bottom and a side wall together defining an internal reservoir containing the beverage to be heated. A base of the system is operable to heat the container at the bottom thereof. The base is constructed of multiple layers generally comprising at least a top barrier layer, an electrically non-conductive bottom barrier layer and a thin film heating element intermediate the top barrier layer and the bottom barrier layer.

In another embodiment, a portable container system for heating a beverage generally comprises a container for containing a beverage to be heated. The container generally comprises a bottom and a side wall together defining an internal reservoir for containing the beverage to be heated. The container further generally comprises an elongate spout extending from the side wall and open to the internal reservoir for dispensing beverage from the container through the spout. The spout is constructed of multiple layers including a generally tubular inner barrier layer defining a conduit through which beverage from the container flows through the spout, a generally tubular outer barrier layer, and a thin film heating element disposed intermediate the inner barrier layer and the outer barrier layer.

In yet another embodiment, a portable container system for heating a beverage generally comprises a container for containing a beverage to be heated. The container generally comprises a bottom and a side wall together defining an internal reservoir containing the beverage to be heated. The container further generally comprises a handle connected to the side wall for gripping the container. The thin film heating element being configured for electrical communication with a power source via at least one electrical wire disposed within the handle.

BRIEF DESCRIPTION

Corresponding reference characters indicate corresponding parts throughout the several views of the drawings.

DETAILED DESCRIPTION

Figure 1:
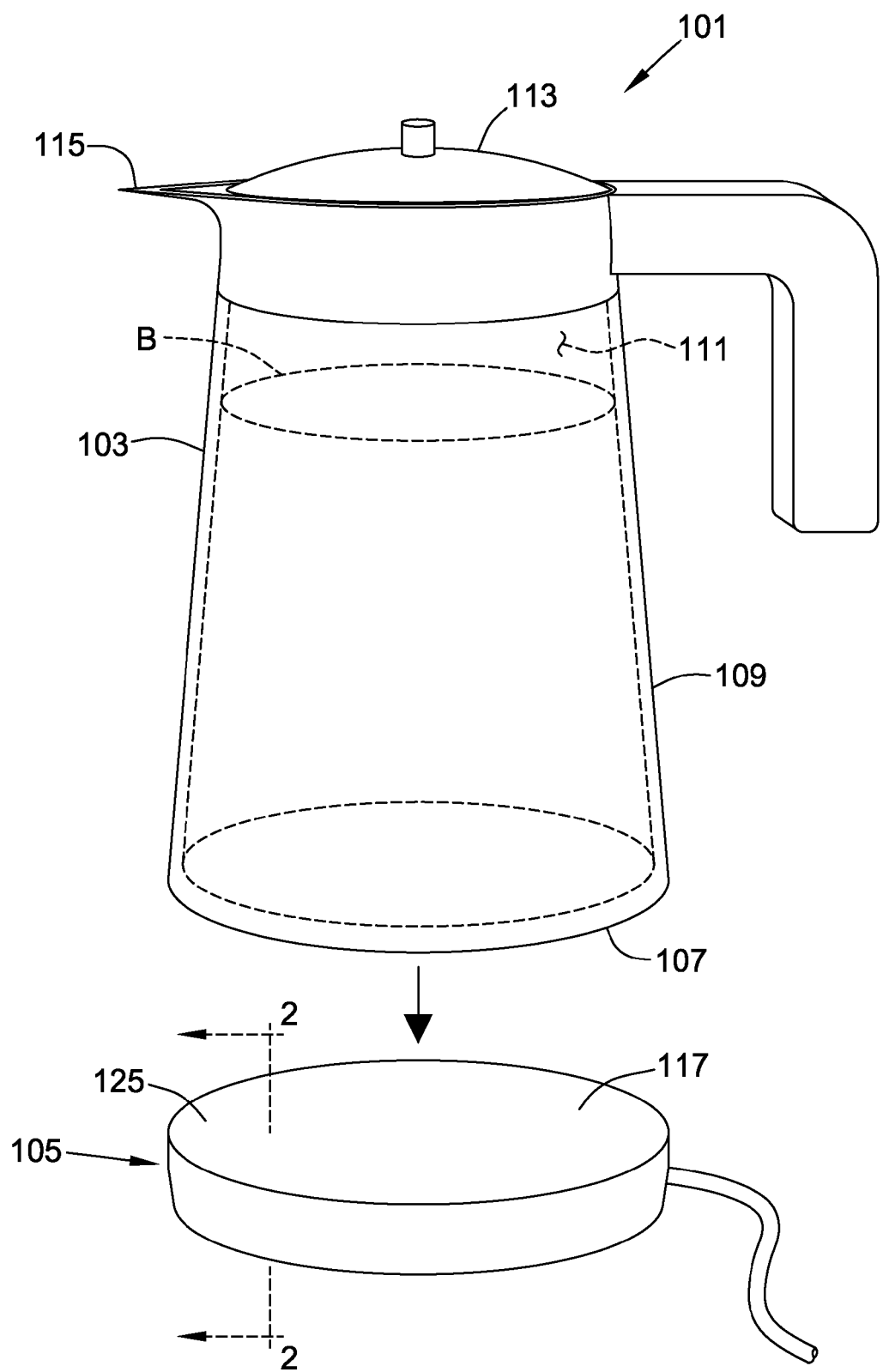
FIG. 1 is a perspective view of one embodiment of a portable container system for heating a beverage in which the system comprises a beverage container and a heating plate.
Figure 2:
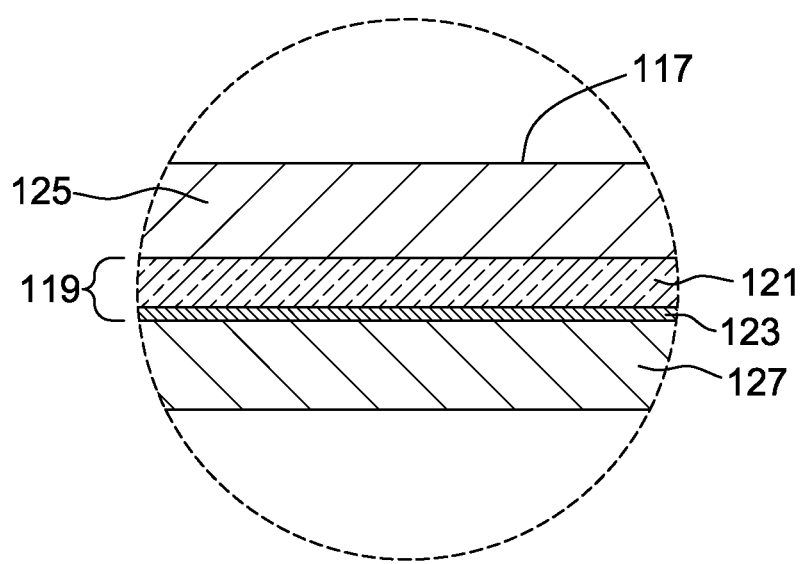
FIG. 2 is an enlarged portion of a cross-section taken in the plane of line 2-2 of FIG. 1.

With reference now to the drawings and in particular to FIGS. 1 and 2, one embodiment of a portable container system for heating beverages is indicated generally at 101. The term "portable" refers herein to the ability of a container 103 of the system, during or after heating of a beverage, to be carried by a person to a remote location for dispensing such as pouring into a cup. The beverage to be heated by the container system 101 may be any beverage including, without limitation, water, coffee, tea, soup, milk, hot chocolate or other beverage that is typically served hot.

The portable container system 101 illustrated in FIG. 1 comprises the container 103 configured for holding a beverage B therein, and a heating plate 105 configured such that the container is capable of being removably seated on the heating plate for heating the contents of the container. The illustrated container 103 includes a bottom 107 and a side wall 109 that together define a reservoir 111 within the container. The container 103 may also include a lid 113 or other suitable closure for closing the container. The container 103 illustrated in FIG. 1 is generally cylindrical and elongate such as in the manner of a carafe or coffee pot, and includes a spout 115 generally at the top of the container to facilitate ease of dispensing beverage B from the container.

It is understood that in other embodiments the container 103 may be configured other than as illustrated in FIG. 1. For example, in other embodiments the container 103 may be in the form of a more traditional tea kettle shape or other suitable shape without departing from the scope of this invention. While not shown in the drawings herein, it is also contemplated that additional components may be disposed within or on the container 103 to facilitate the making of a flavored beverage during the heating operation or during the dispensing operation. Examples include, without limitation, a tea leaf or tea bag holder, a coffee ground holder or other particulate beverage holder or the like. The container 103 may be constructed of glass, metal, ceramic or other suitable material.

The heating plate 105 includes a generally flat upper surface 117 on which the container 103 sits during heating of the beverage B within the container. With reference to FIG. 2, the heating plate 105 is suitably of a multi-layer construction and includes at least one thin film heating element 119. It is understood that in other embodiments the heating plate 105 may include two or more thin film heating elements 119 and remain within the scope of this invention. As used herein, a heating element is considered to be a "thin-film" heating element in the sense that it comprises a substrate 121 and a thin film layer 123 of an electrically conductive material that together have a collective thickness that is only marginally greater than the thickness of the substrate itself.

For example, the heating element substrate 121 in one embodiment may be a glass substrate (e.g., a borosilicate substrate, a glass-ceramic substrate, a quartz substrate, etc.), and the thin film layer 123 of electrically conductive material may be a metal oxide material (e.g., a tin oxide material). One suitable example of a thin film heating element 119 is made by Thermo-Stone USA, Reno, Nev. A busbar or wires (not shown) are associated with the thin film layer 123 of the heating element 119 and in electrical communication with a suitable power source (not shown) and controller (not shown) for supplying current to the thin film heating element to generate heat. Other examples of such heating elements and associated structures may be found in U.S. Pat. Nos. 5,577,158; 5,616,266; 5,932,128; 5,940,579; 5,973,298; 6,072,165; 6,376,816; and 6,242,722.

In one embodiment the controller is operable to operate the heating plate 105 in on/off modes. For example, when "on" is activated, the container 103 is in place and the beverage B in the container is not boiling or at a desired temperature, power is supplied to the heating plate 105. When "on" is activated, the container 103 is in place and the beverage B in the container is boiling or at a desired temperature, power is no longer supplied to the heating plate 105. And when "on" is activated and the container 103 is not in place, power is not supplied to the heating plate 105. When the system is switched "off," no power is supplied to the heating plate 105. A suitable sensor (not shown) may be used to determine when the beverage B in the container 103 is boiling or otherwise at a desired temperature.

In the illustrated embodiment of FIG. 2, the multi-layered heating plate 105 further comprises a top barrier layer 125 and a bottom barrier layer 127 between which the substrate 121 and thin film layer 123 are sandwiched. In this manner, if the heating plate 105 is dropped or impacted in a manner that causes the glass substrate 121 of the thin film heating element 119 to break, the barrier layers 125, 127 inhibit shards from falling out of the heating plate.

The top barrier layer 125 defines the upper surface 117 of the heating plate 105 and is suitably thermally conductive or thermally transparent so that heat generated by the heating element is readily conducted to and/or radiated through the top barrier layer and passed to and/or through the top barrier layer to the container 103 for heating the contents of the container. It is understood that the top barrier layer 125 may comprise a single layer of material or it may comprise multiple layers of material without departing from the scope of this invention.

The bottom barrier layer 127 is constructed of a suitable electrically non-conductive and thermally non-conductive or at least insulating material to inhibit electrical contact of the thin film heating element 119 by a user, and to inhibit heat from the thin film heating element against being radiated or conducted to a surface (e.g., countertop or desktop) on which the heating plate 105 is seated during use.

While not illustrated herein, it is contemplated that the heating plate 105 may be further configured to include a compartment or housing for containing one or more internal power sources, such as batteries, for powering the heating element instead of or in addition to using an external power source as illustrated in FIG. 1.

In operation, the container 103 is filled with a beverage B to be heated and is placed on the heating plate 105. Current is supplied to the thin film heating element 119 to heat the upper surface 117 of the heating plate 105. Heat from the thin film heating element 119 heats the container 103 and hence the beverage B therein. The container 103 is then removed from the heating plate 105 and may be carried to a remote location for dispensing.

Figure 3:
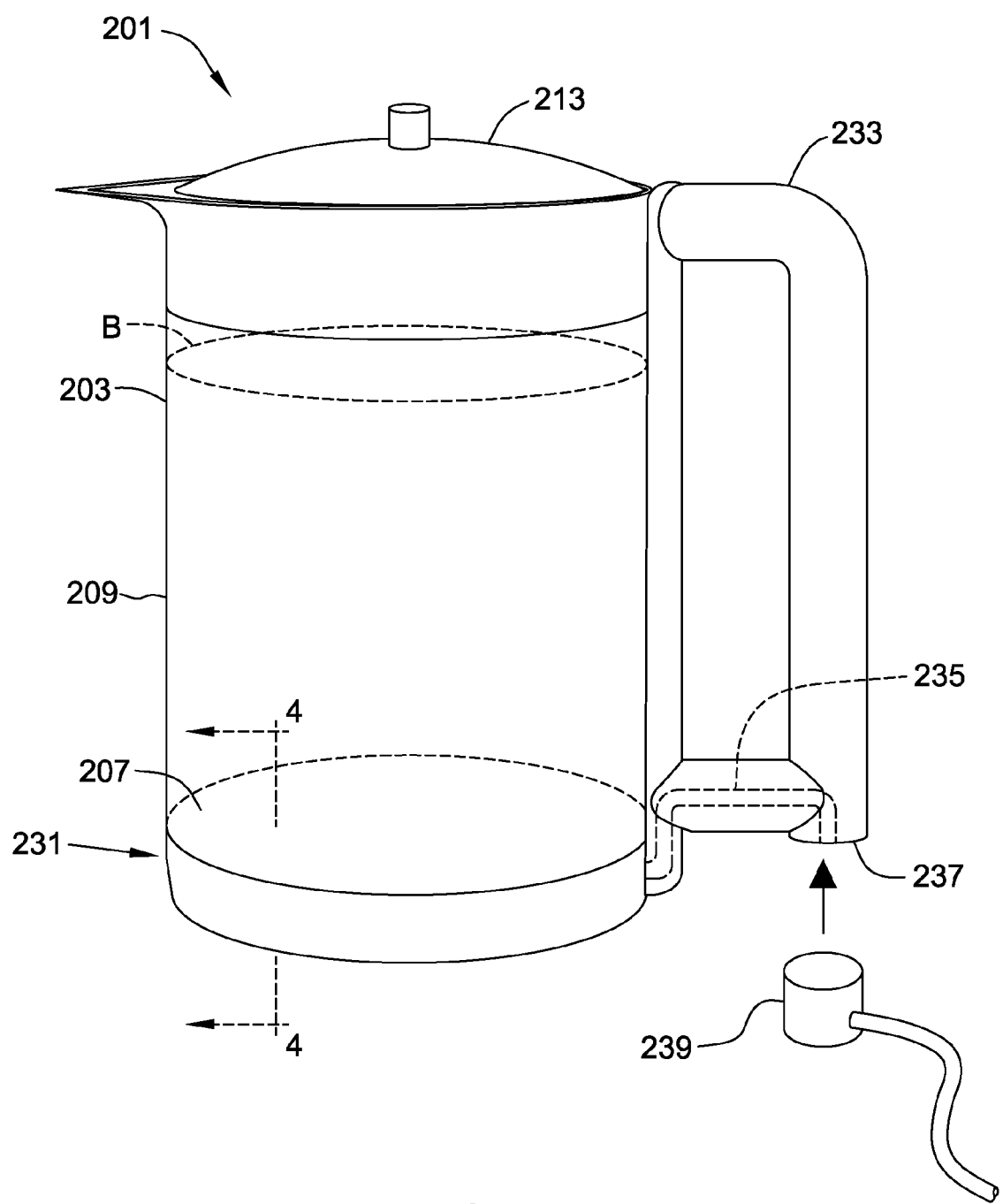
FIG. 3 is a perspective view of a second embodiment of a portable container system for heating a beverage in which the system comprises a container and heating element held in assembly with each other.
Figure 4:
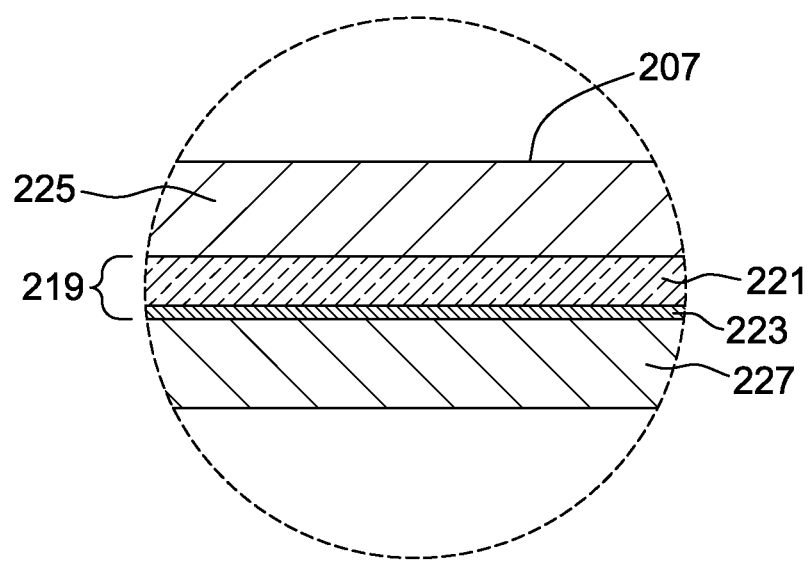
FIG. 4 is an enlarged portion of a cross-section taken in the plane of line 4-4 of FIG. 3.

FIGS. 3 and 4 illustrate a second embodiment of a portable container system 201 for heating a beverage B. In this embodiment, the container system 201 comprises a container 203 and thin film heating element 219 that are held in assembly so that the heating element remains with the container during heating, transport and dispensing. The container 203 is in some respects similar to the container 103 of FIG. 1 in that it includes a bottom 207 and a side wall 209. While the container 203 is of generally the same shape as that of the container 103 of FIG. 1, it is understood that it may have any of the shapes described previously herein and remain within the scope of this invention. A base 231 of the container 203 is attached to the bottom 207 of the container and more suitably in part defines the bottom of the container.

For example, in one embodiment, illustrated in FIG. 4, the base 231 of the container 203 is comprised of multiple layers including the thin film heating element 219. As in the first embodiment, the thin film heating element 219 comprises a substrate 221 and a thin film layer 223 of electrically conductive material. The base 231 also includes a top barrier layer 225 and a bottom barrier layer 227 between which the thin film heating element 219 is sandwiched.

A suitable controller (not shown) may comprise a Strix electrical controller to allow for "cordless" connection and control. It is also appreciated that the controller may regulate the amount of heat that is generated by the thin film heating element 219. For example, in one embodiment operation of the heating element 219 may be controlled by switching the system on and allowing the heating element 219 to operate until the contents of the container boil or reach a desired temperature, at which time the heating element will automatically shut off by means already known in the art. Alternatively, operation of the heating element 219 may be shut off manually.

The top barrier layer 225 is suitably thermally conductive or thermally transparent so that heat generated by the heating element 219 is readily conducted to and/or radiated through the top barrier layer. In the illustrated embodiment the top barrier layer 225 defines the bottom 207 of the container 203. In alternative embodiments, the top barrier layer 225 of the base 231 and the bottom 207 of the container 203 may be formed separate from each other and attached by any suitable attachment technique for the materials being used as the respective top barrier layer of the base and bottom of the container. It is also understood that the top barrier layer 225 may comprise a single layer of material or it may comprise multiple layers of material without departing from the scope of this invention.

The bottom barrier layer 227 is constructed of a suitable electrically non-conductive and thermally non-conductive or insulating material to inhibit electrical contact of the thin film heating element 219 by a user, and to inhibit heat from the thin film heating element against being radiated or conducted to a surface (e.g., countertop or desktop) on which the system 201 is seated.

A handle 233 is mounted on the side wall 209 of the container 203 for use in gripping and carrying the container. At least a portion of the handle 233 is sufficiently hollow to permit suitable wiring 235 to extending therein for connecting the thin film heating element 219 to a power source. For example, in the illustrated embodiment a lower end 237 of the handle 233 is recessed and configured to receive a power source connection 239.

In operation, the power source connection 239 is connected to the handle 233 to electrically connect the power source to the wiring 235 within the handle. The container 203 is filled with a beverage B to be heated. The thin film heating element 219 is then operated to heat the beverage B. The power source connection 239 may then be disconnected from the handle 233 and the container 203 may be carried to a remote location, with the base 231 that includes the thin film heating element 219 still held in assembly with the container, for dispensing the heated beverage. It is understood that the container 203 may instead be lifted and the beverage B dispensed while the power source connection 239 remains connected to the handle 233.

In other embodiments, the handle 233 may alternatively, or additionally, be configured to house one or more batteries (not shown) therein in electrical communication with the thin film heating element 219. In such an embodiment, the thin film heating element 219 may remain in a heating mode as the container 203 is being carried.

Figure 5:
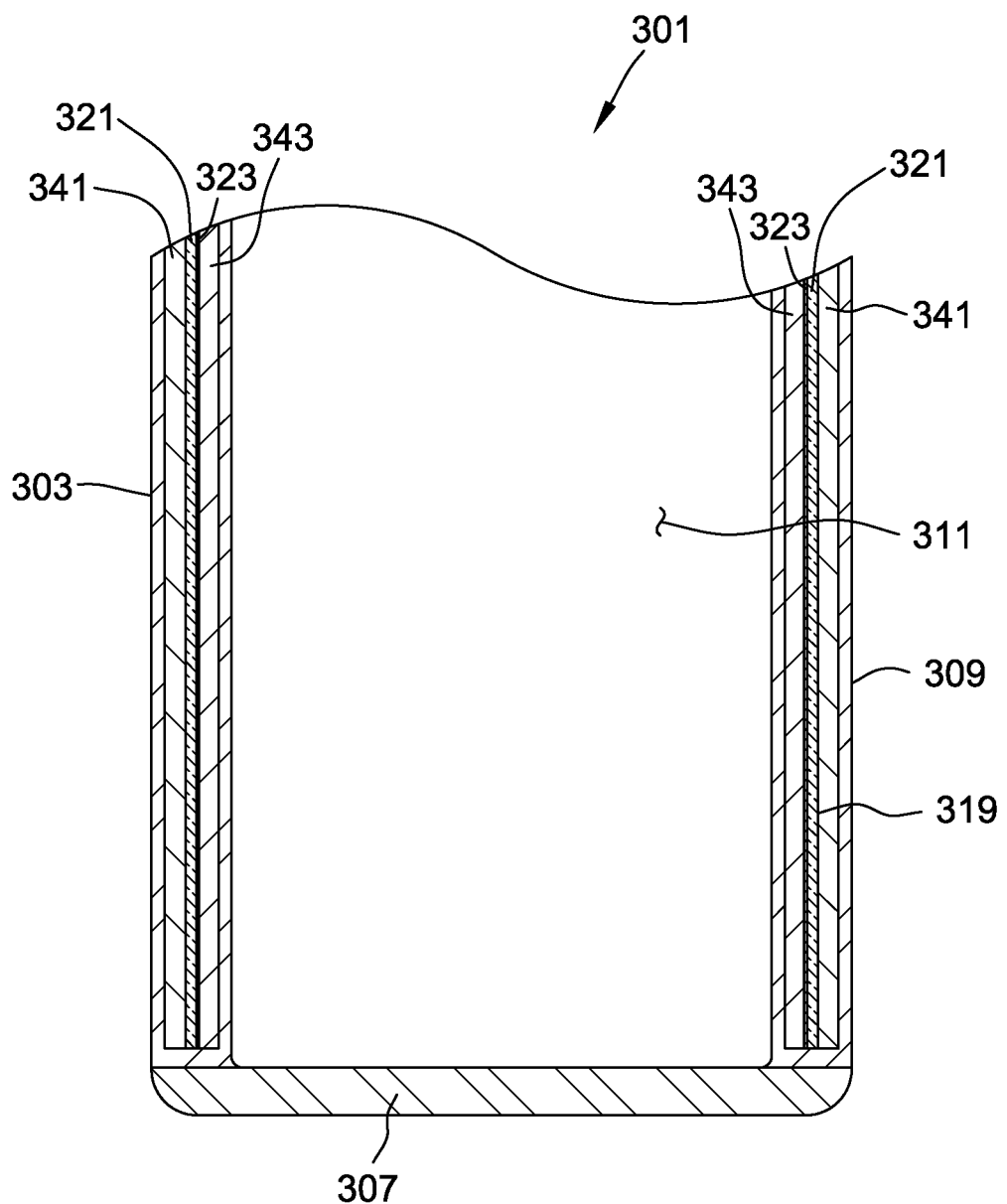
FIG. 5 is a vertical cross-section of a third embodiment of a portable container system for heating a beverage.

FIG. 5 illustrates a third embodiment that is similar to the embodiment of FIG. 3 in all respects, but with the base 231 of the system 201 of FIG. 3 omitted. Instead, the side wall 309 of the container 303 of this embodiment is configured to include a thin film heating element 319. In particular, the side wall 309 is multi-layered including an outer barrier layer 341, an electrically conductive thin film layer 323, a substrate layer 321 and an inner barrier layer 343 defining the interior reservoir 311 of the container 303.

The inner barrier layer 343 is suitably electrically non-conductive and thermally conductive or thermally transparent so that heat generated by the heating element 319 is readily conducted to and/or radiated through the inner barrier layer into the reservoir 311. It is understood that the inner barrier layer 343 may be multiple layers, as in the illustrated embodiment, or it may be a single layer of material within the scope of this invention.

The outer barrier layer 341 is constructed of a suitable electrically non-conductive material to inhibit electrical contact of the thin film heating element 219 by a user. In some embodiments the outer barrier layer 341 may also be of a material suitable to inhibit heat from the thin film heating element 319 against being radiated or conducted to the outer surface of the container 303. The outer barrier layer 341 may be multiple layers, as illustrated in FIG. 5, or it may be a single layer.

The thin film heating element 319 (i.e., the substrate 321 and electrically conductive thin film layer 323) suitably extends annularly about the circumference of the container 303. In other embodiments, the substrate 321 itself may extend continuously about the circumference of the container 303, while discrete segments of electrically conductive thin film layers 323 are spaced intermittently about the circumference of the container. In still other embodiments, a plurality of thin film heating elements 319, each comprising the substrate 321 and electrically conductive thin film layer 323, may be spaced intermittently about the circumference of the container 303 and/or intermittently lengthwise of the container side wall 309.

It is contemplated that in other embodiments the inner barrier layer 343, the outer barrier layer 341 and the substrate 321 may each be constructed of a transparent material such that the beverage B in the container 303 is visible at all times, even while the thin film heating element 319 is operating.

It also understood that the container system 301 of this embodiment may include a container 303 having the base 231 of the embodiment of FIG. 3, with the thin film heating element 219 therein, along with the side wall 309 construction of the embodiment of FIG. 5 to facilitate quicker and more uniform heating of the beverage B in the container.

Figure 6:
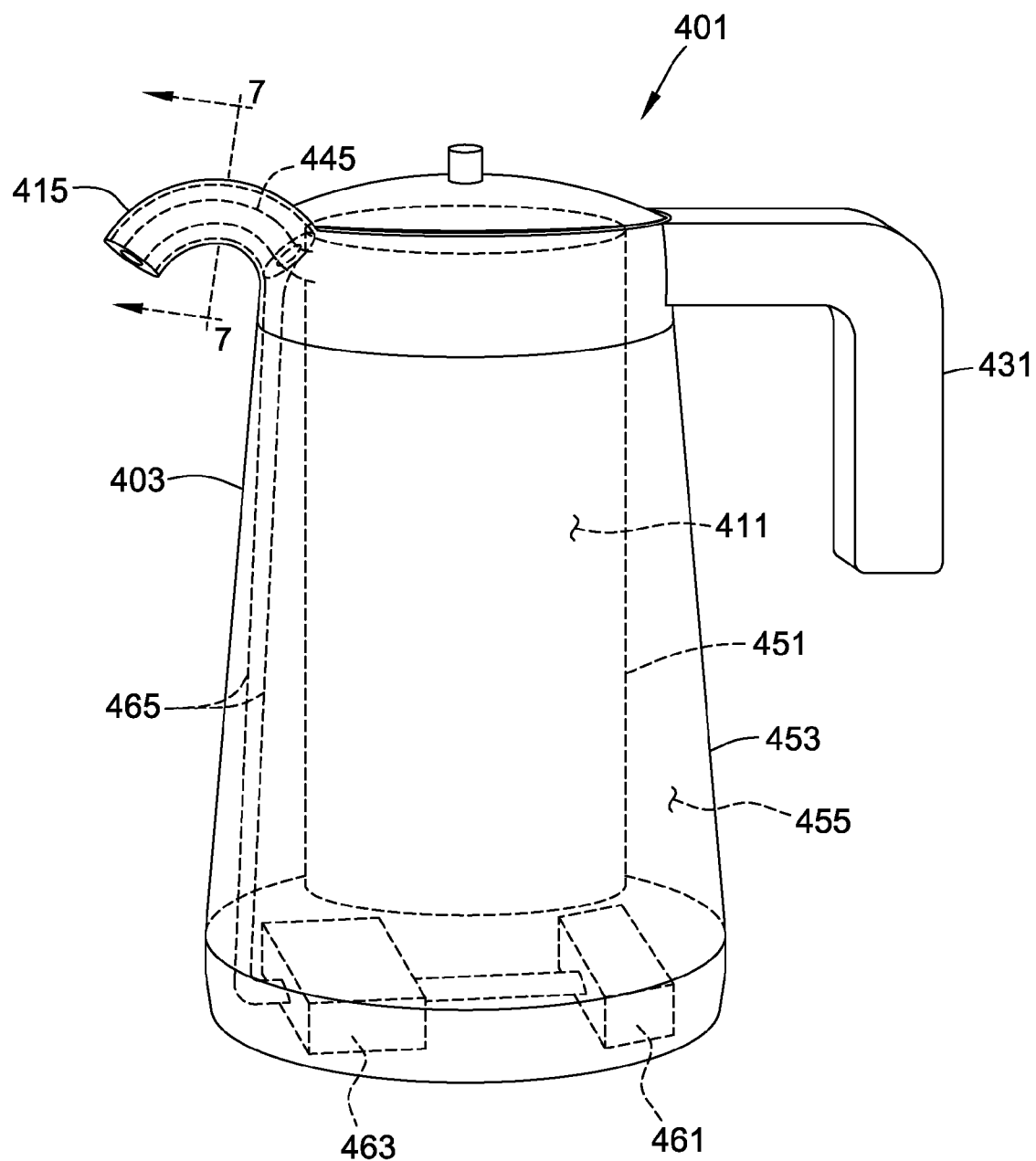
FIG. 6 is a perspective view of a fourth embodiment of a portable container system for heating a beverage in which the system comprises a container having a pour spout formed at least in part of a thin film heating element.
Figure 7:
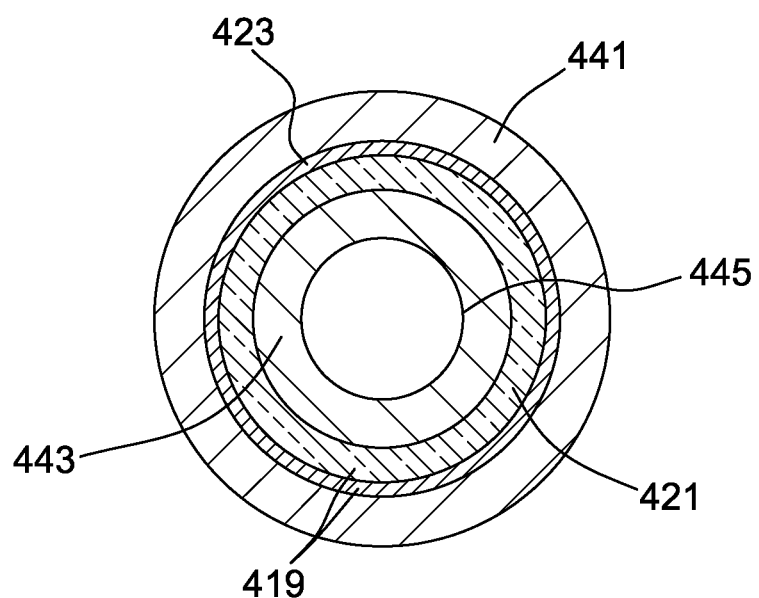
FIG. 7 is an enlarged portion of a cross-section taken in the plane of line 7-7 of FIG. 6.

With reference now to FIGS. 6 and 7, a fourth embodiment of a portable container system for heating a beverage is indicated generally at 401. In this embodiment, the portable container system 401 includes a container 403 having an outer side wall 453 and an inner side wall 451 disposed within and spaced from the outer side wall. In this manner, the inner side wall 451 defines a reservoir 411 in which a beverage (not shown) to be heated is contained. The space between the outer side wall 453 and the inner side wall 451 defines a housing 455 for various operating components of the system 401 as described in further detail later herein.

The container 403 also includes a handle 433 and further includes an elongate spout 415 configured generally in the manner of a tea kettle type spout. The spout 415 may be arched or curved as illustrated in FIG. 6, or it may be straight or any other suitable configuration.

In this embodiment, the spout 415 is constructed to include a thin film heating element 419. For example, as illustrated in FIG. 7, the spout 415 may be of a multi-layer construction including an outer barrier layer 441, a thin film heating element 419 in the form of an electrically conductive thin film layer 423 and a substrate 421, and an inner barrier layer 443 defining a conduit 445 through which beverage is dispensed from the container 403.

The inner barrier layer 443 is suitably electrically non-conductive and thermally conductive or thermally transparent so that heat generated by the heating element 419 is readily conducted to and/or radiated through the inner barrier layer into the conduit 445. It is understood that the inner barrier layer 443 may be a single layer as in the illustrated embodiment, or it may be multiple layers within the scope of this invention.

The outer barrier layer 441 is constructed of a suitable electrically non-conductive material to inhibit electrical contact of the thin film heating element 419 by a user. In some embodiments the outer barrier layer 443 may also be of a material suitable to inhibit heat from the thin film heating element 419 against being radiated or conducted to the outer surface of the spout 415. The outer barrier layer 441 may be a single layer, as illustrated in FIG. 7, or it may be a multiple layers.

The thin film heating element 419 (i.e., the substrate 421 and electrically conductive thin film layer 423) suitably extends annularly about the circumference of the spout 415. In other embodiments, the substrate 421 itself may extend continuously about the circumference of the spout 415 while discrete segments of electrically conductive thin film layers 423 are spaced intermittently about the circumference of the spout. In still other embodiments, a plurality of thin film heating elements 419, each comprising the substrate 421 and electrically conductive thin film layer 423, may be spaced intermittently about the circumference of the spout 415 and/or intermittently lengthwise of the spout.

It is contemplated that in other embodiments the inner barrier layer 443, the outer barrier layer 441 and the substrate 421 may each be constructed of a transparent material such that the beverage is visible as it flows through the spout 415, even while the thin film heating element 419 is operating.

A power source 461 such as one or more batteries is disposed within the container housing 435 along with a suitable controller 463. The controller 463 is in electrical communication with the thin film heating element 419 via suitable wiring 465 disposed within the container housing 435. In this manner, the container system 401 may be located anywhere and still be operated to heat a beverage.

In operation of the container system 401 of this embodiment, when a user wishes to dispense a hot beverage the user operates the controller 463 to energize the thin film heating element 419. Once the heating element 419 is generating heat, the user tilts the container 403 so that beverage from the reservoir 411 enters and runs through the conduit 445 within the spout 415. Heat from the thin film heating element 419 rapidly heats the beverage as it flows through the conduit 445 of the spout 415 before being dispensed from the open end of the spout.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A portable container system for heating a beverage, the portable container system comprising:
   a container for containing a beverage to be heated, the container comprising a bottom and a side wall together defining an internal reservoir for containing the beverage to be heated, the container further comprising an elongate spout extending from the side wall and open to the internal reservoir for dispensing beverage from the container through the spout, the spout being constructed of multiple layers including a generally tubular inner barrier layer defining a conduit through which beverage from the container flows through the spout, a generally tubular outer barrier layer, and a thin film heating element disposed intermediate the inner barrier layer and the outer barrier layer.

2. The portable container system set forth in claim 1 wherein the side wall comprises an inner side wall, the container further comprising an outer side wall spaced surrounding the inner side wall in spaced relationship therewith to define a housing therebetween, the system further comprising a power source disposed with the housing an electrically connected to the thin film heating element.

3. The portable container system set forth in claim 2 further comprising a controller disposed with the housing for controlling operation of the thin film heating element.

4. The portable container system set forth in claim 1 wherein the thin film heating element comprises a substrate and an electrically conductive thin film layer, the electrically conductive thin film layer being intermediate the substrate and the outer barrier layer.

\* \* \* \* \*